(12) United States Patent
Moran

(10) Patent No.: US 11,470,815 B2
(45) Date of Patent: Oct. 18, 2022

(54) APPARATUS FOR TRAINING PETS

(71) Applicant: Christopher Lee Moran, Cedar Creek, TX (US)

(72) Inventor: Christopher Lee Moran, Cedar Creek, TX (US)

(*) Notice: Subject to any disclaimer, the term of this patent is extended or adjusted under 35 U.S.C. 154(b) by 82 days.

(21) Appl. No.: 17/085,080

(22) Filed: Oct. 30, 2020

(65) Prior Publication Data

US 2021/0212289 A1    Jul. 15, 2021

(51) Int. Cl.
*A01K 15/02*    (2006.01)

(52) U.S. Cl.
CPC .................................. *A01K 15/02* (2013.01)

(58) Field of Classification Search
CPC .. A01K 15/025; A01K 15/027; A01K 15/021; A01K 15/02
See application file for complete search history.

(56) References Cited

U.S. PATENT DOCUMENTS

| | | | | |
|---|---|---|---|---|
| 3,295,499 | A * | 1/1967 | Manchester | A01K 15/025 119/708 |
| 5,467,740 | A * | 11/1995 | Redwine | A01K 15/025 473/576 |
| 5,713,307 | A * | 2/1998 | Polston | A01K 15/026 119/708 |
| 9,814,215 | B2 * | 11/2017 | Renforth | A01K 29/00 |
| 10,034,459 | B1 * | 7/2018 | Scanlan | H04R 1/028 |
| 10,609,905 | B2 * | 4/2020 | Renforth | B25G 1/04 |
| 2013/0192536 | A1 * | 8/2013 | Lohmann | A01K 15/025 119/707 |
| 2013/0340684 | A1 * | 12/2013 | Townsend | A01K 15/025 119/708 |
| 2018/0014507 | A1 * | 1/2018 | Lorig | A01K 15/026 |
| 2018/0146643 | A1 * | 5/2018 | Pennington | A01K 15/025 |
| 2019/0090456 | A1 * | 3/2019 | Dominguez | A01K 15/025 |

* cited by examiner

*Primary Examiner* — Trinh T Nguyen

(57) ABSTRACT

A flirt pole constructed of a collapsible and/or telescopic pole with a long string or rope comprising a flexible material attached at a head of the pole via a fail-safe mechanism, and a lure, such as a toy that may entice the pet to chase, attached to the far end of the string or rope. The head may be safely snatched of the pole along with the rope and lure when a force exceeding a particular level is applied to the rope, lure, and on head of the pole.

17 Claims, 4 Drawing Sheets

APPARATUS FOR TRAINING PETS

CROSS-REFERENCES TO RELATED APPLICATIONS

This application claims the benefit of provisional application No. 62/957,860 entitled APPARATUS FOR TRAINING PETS, filed Jan. 7, 2020. The provisional application is incorporated in its entirety by reference.

FIELD OF INVENTION

The present invention relates generally to an apparatus that may be used for training pets. More particularly, the present invention is related to a flirt pole/flirt stick which may be used as a piece of exercise or training equipment for pets such as dogs, cats, etc.

BACKGROUND OF THE INVENTION

A flirt pole or flirt stick can refer to a piece of training or exercise equipment for pets that entices pets to chase a fast-moving lure. Such equipment may be used to physically condition pets and improve their performance for achieving better health as well as skills in certain competitions such as lure-coursing. One advantage of a flirt pole is that they can be used to train pets in a limited space thereby making it usable indoors as well.

A flirt pole or stick may be used to promote physical activity and stimulate mental activity of pets by offering a constantly moving lure to stimulate a pet's prey drive.

A flirt pole may be designed of as few as three parts—the pole, a rope, and a lure, similar in appearance to a fishing pole—though this construction may have disadvantages with regard to training and exercise results. For example, in some cases, a flirt pole of such simple construction may be damaged due to a sudden pulling force exerted by the pet upon catching the lure. This may result in the lure breaking away from the rope, the rope being damaged, and/or the pole being broken. Further, such simple designs can be conducive to accidents that may cause injury to the trainer or pet.

It may, therefore, be advantageous to provide an improved design for a flirt pole to reduce the chance of damage to the pole and the potential for accident injury to the trainer and/or pet.

SUMMARY OF THE INVENTION

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. The present invention is defined by the claims.

Some embodiments of the present invention may be constructed of a long stick or pole made of light wood, such as bamboo, or light plastic, such as PVC, with a long string or rope comprising a flexible material attached at one end. In some embodiments of the present invention, a lure, such as a toy that may entice the pet to chase, is attached to the other end of the rope.

In operation, embodiments of the present invention may be held by a trainer and, through a variety of motions, the trainer may move the rope and lure rapidly as to "flirt" with the pet. As the term is used herein, "to flirt" refers to moving the rope and lure such that the pet is enticed to chase but cannot easily catch the lure. By flirting with the pet, the trainer may induce various physical and/or mental responses in the pet, including but not limited to running, jumping, watching, planning, and changing directions.

In some embodiments of the invention, the long pole and flexible rope make it easy for the trainer to use momentum to make the lure move fast (even faster than the pet can run), change directions quickly, and/or move the lure to various heights.

In some embodiments, the present invention comprises a pole that is collapsible and/or telescopic. Embodiments comprising a telescopic pole may allow a trainer to adjust the length of the pole.

Some embodiments of the present invention may comprise a fail-safe mechanism. For example, some embodiments of the present invention may comprise a pole having a head that is attached to a rope and lure wherein the head may be safely snatched of the pole along with the rope and lure when a force exceeding a particular level is applied to the rope, lure, and on head of the pole.

Some embodiments of the present invention comprise a set of hooks for securing and storing the rope attached to the pole.

BRIEF DESCRIPTION OF THE DRAWINGS

The present invention is described in detail below with reference to the attached drawing figures, wherein.

DETAILED DESCRIPTION OF THE INVENTION

Some embodiments of the present invention are described with specificity herein to meet statutory requirements. However, the scope of the invention is not intended to be defined by the description itself. The claimed subject matter may be embodied as to include different features, elements, components, steps, or combinations of steps, similar to those described herein, and in combination with other existing or future technologies. Moreover, although the term "step" might be used to connote different elements of the methods employed, this term should not be interpreted as implying any particular order among or between various steps herein disclosed unless and except the order of individual steps is explicitly described or required.

Some embodiments of the present invention comprise an apparatus that may be used in training pets such as cats and dogs. As used herein, the terms "trainer" and "user" are interchangeable and denote the individual operating the present invention. Some embodiments of the present invention provide an improvement on a flirt pole. As described herein, some embodiments of the present invention comprise a pole portion having a proximal end and a distal end. As used herein, the proximal end of the pole portion describes the end nearer to the trainer, while the distal end describes the end furthest from the trainer during the operation of the invention. Some embodiments described herein comprise a pole portion which may be collapsible, which is to say the distance between the distal and proximal ends of the pole portion can be caused to reduce. Some embodiments of the present invention comprise a pole portion having a telescopic structure, enabling the flirt pole to operate with various configurations of length.

Some embodiments of the present invention comprise a head component located at the distal end of the pole portion. Further, some embodiments comprise a rope attached at the head component. The rope may have proximal and distal ends, wherein the proximal end of the rope is attached at the head component while the distal end of the rope is attached to a lure. The head component may be constructed in such a way as to allow the rope and lure to release from the pole portion if, for example, an excess force is applied to the rope and/or lure. In some embodiments of the present invention, some part or all of the head component may release from the pole portion along with the rope and lure. In some embodiments, this may allow the head portion to function as a failsafe by avoiding damage to the pole portion and/or the rope, as well as preventing accidental injury to the pet and/or trainer.

Figure 1:
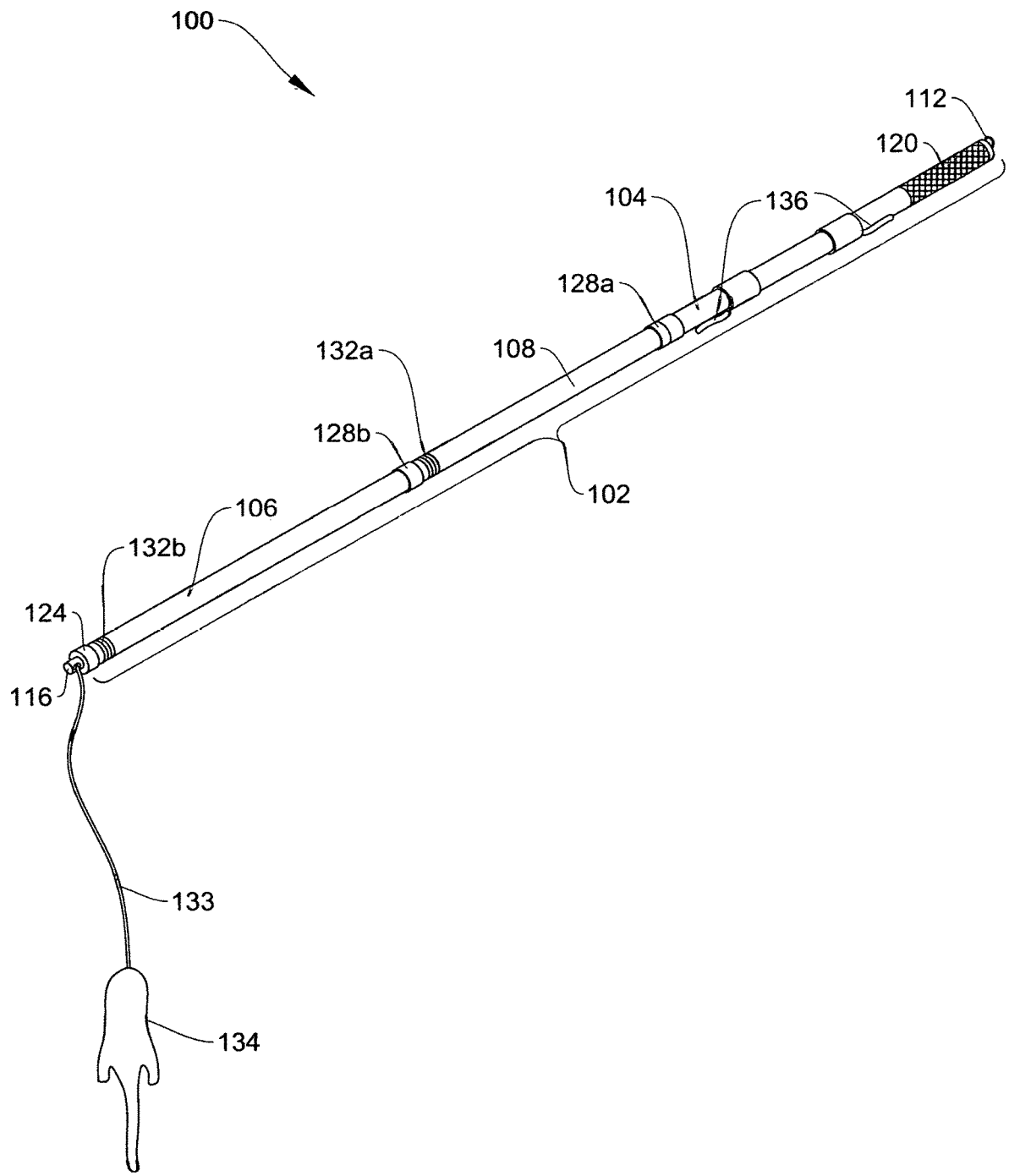
FIG. 1 illustrates a view of an exemplary flirt pole apparatus.

With reference to FIG. 1, a view of an exemplary flirt pole apparatus 100 is given. The pole portion 102 may have a telescoping design that may allow for the various lengths to be used in operation. As depicted here, the external tube portion 104 corresponds to the proximal end of the pole portion 112 and the internal cylinder portion 106 corresponds to the distal end of the pole portion 116. One having skill in the art will recognize that a configuration wherein the internal cylinder portion 106 corresponds to the proximal end 112 and the external tube portion 104 corresponds to the distal end 116 is likewise possible.

The pole portion 102 may be made of various materials including, but not limited to, plastics such as PVC, composite materials such as carbon fiber, metals such as steel and aluminum as well as related alloys, wood, bamboo, and the like. FIG. 1 provides an embodiment wherein the pole portion 102 may comprise a nesting design further comprising an external tube portion 104 having an open end and at least one internal cylinder portion 106, whereby the at least one cylinder portion can fit within the external tube portion 104 through the open end of the external tube portion 104. In some embodiments, the pole portion 102 may comprise one or more intermediate tube sections 108, wherein the one or more intermediate tube section 108 may nest inside the external tube section 106 and each section in sequence can similarly nest within the prior intermediate tube section. In this way, the fully extended pole may be many times longer than the pole is when fully collapsed.

Figure 2:
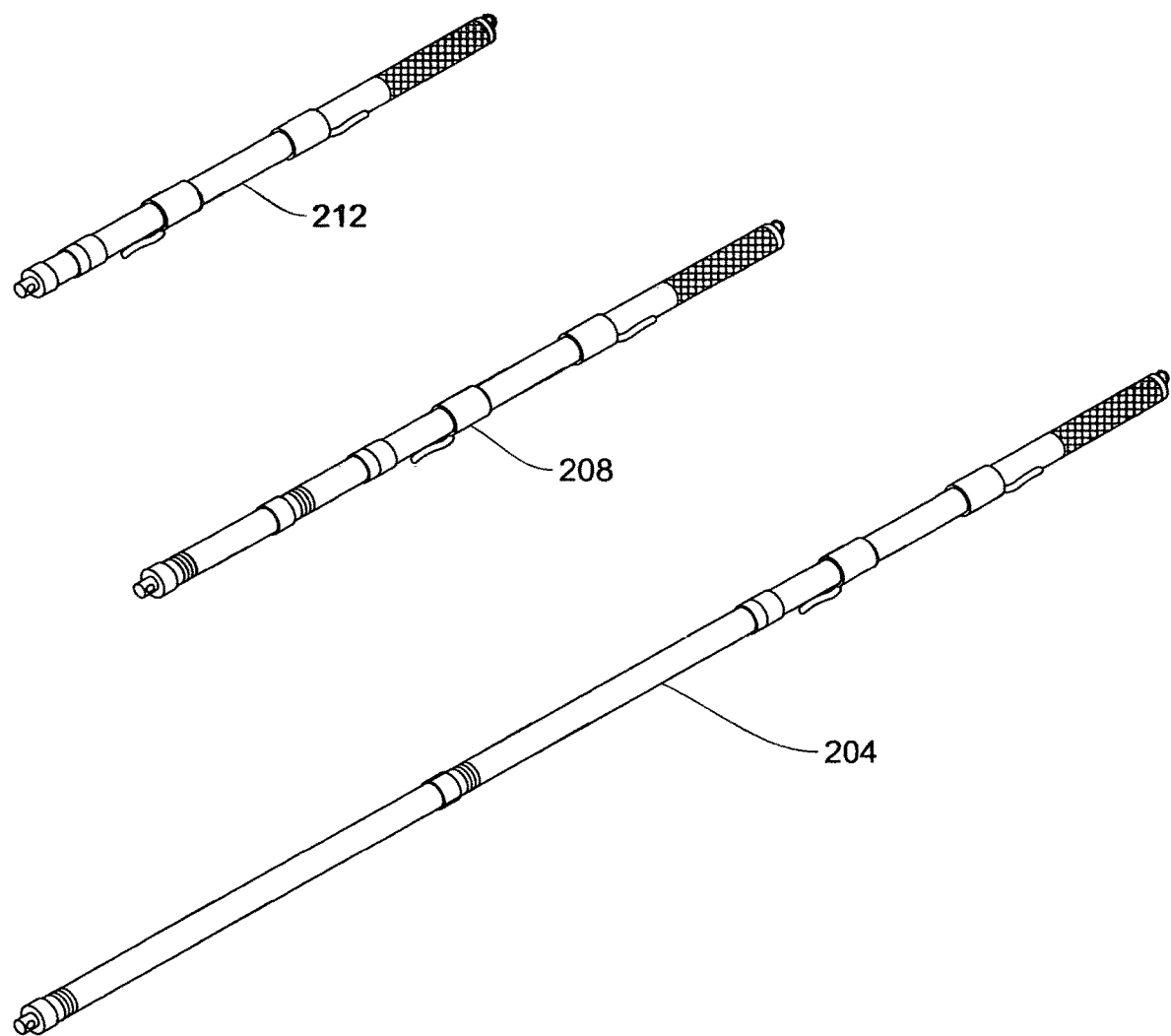
FIG. 2 illustrates several depictions of embodiments of the pole portion of the present invention in various configurations from fully extended to fully collapsed.

FIG. 2 provides several depictions of embodiments of the pole portion of the present invention in various configurations from fully extended to fully collapsed. The fully extended configuration 204 may be suitable for larger pets of for use in large spaces such as outdoors. The partially collapsed configuration 208 may be suitable for smaller pets or for use indoors. The fully collapsed configuration 212 may be suitable in more enclosed spaces or for storage.

With continued reference to FIG. 1, the proximal end 112 may include a handle 120 such that a trainer may comfortably hold the flirt pole. The handle 120 may comprise a compressible material, such as felt or compact foam or the like. The handle 120 may further be covered in a material having advantageous grip properties, such as leather, natural or synthetic rubber, or other similar non-slip material.

A head component 124 is provided at the distal end of the pole portion 116. An embodiment of the head component is shown in greater detail in FIG. 3.

Figure 3:
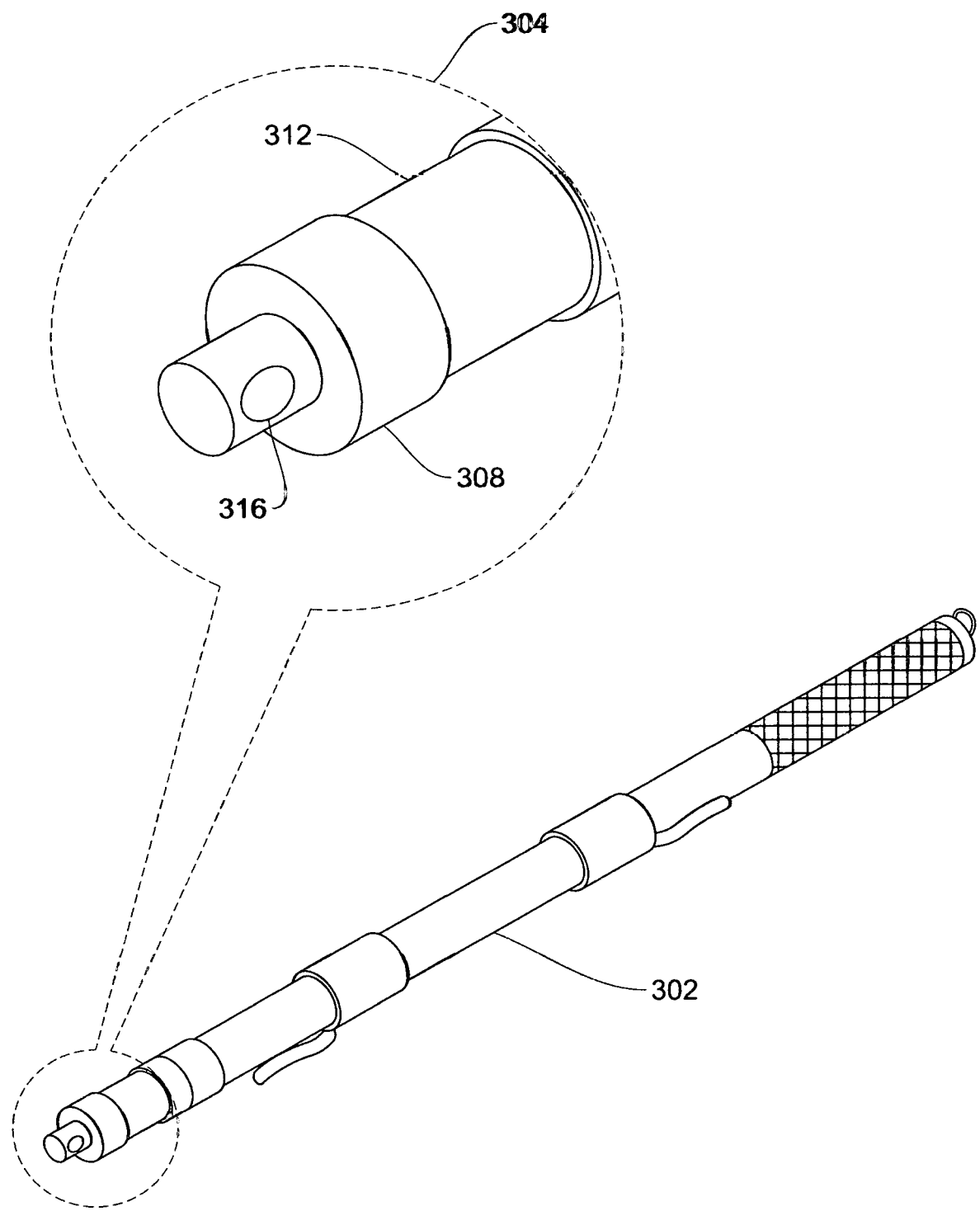
FIG. 3 illustrates an embodiment of a flirt pole with a detail view focused on an embodiment of the head component.

FIG. 3 provides an embodiment of a flirt pole 302 with a detail view 304 focused on an embodiment of head component 308. In the embodiment depicted, head component 308 is fixed to the distal end of the pole component 312 and comprises a connecting mechanism 316 that enables the attachment of rope and lure. Head component 308 is secured to the distal end of the pole component 312 via a binding force. The binding force, in turn, is calibrated such that the rope and lure may be snapped off of the distal end of the pole component 312 by the application of a sufficient pulling force.

Figure 4:
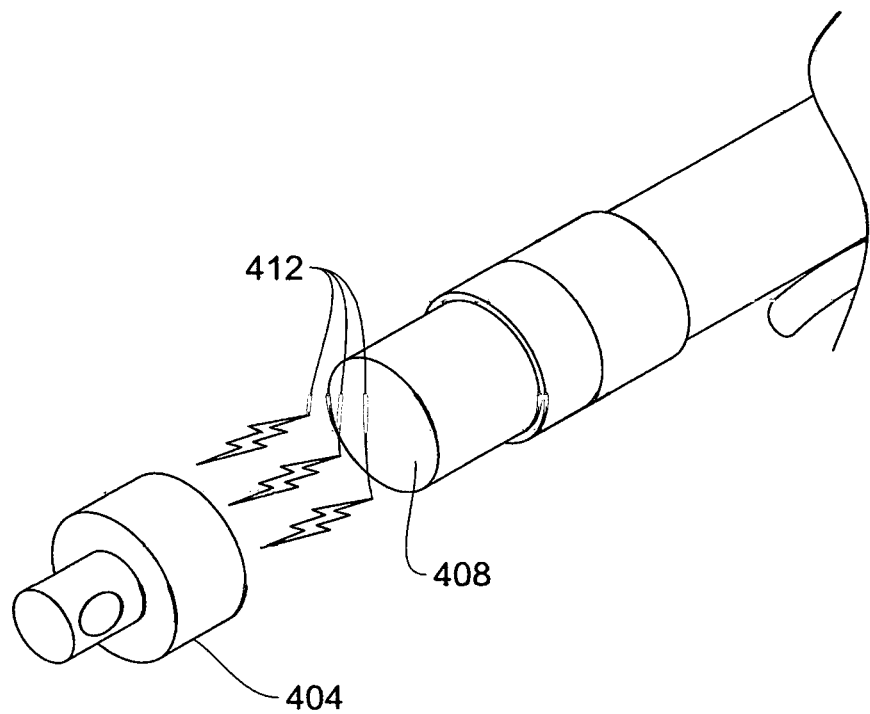
FIG. 4 illustrates the head component in the snapped off configuration from the distal end of the pole portion.

FIG. 4 depicts the head component in the snapped off configuration from the distal end of the pole portion 408. Lines of force 412 indicate the effect of the binding force. Binding force 412 may be calibrated to secure head component 404 to the distal end of the pole component 408 such that the sufficient pulling force or excess force required to overcome it is sufficiently less than a force that would cause damage to the apparatus or any of its components or may cause injury to the trainer or pet in order to ensure safety.

In some embodiments for the present invention, the head component 404 may comprise, in part, a first magnet with a second magnet having a reversed polarity secured at the distal end of the pole component 408 such that the first magnet and the second magnet are attracted in order to produce a binding force. In some other embodiments, the head component 404 may instead comprise a first magnet and a magnetic material, such as iron or steel, etc., may be include in the distal end of the pole component 408 such that the first magnet and the magnetic material are attracted in order to produce a binding force. Likewise, an embodiment wherein head component 404 houses the magnetic material and the distal end of the pole component 408 houses the magnet is also envisioned.

In some other embodiments, the head component may be secured by other means than magnet magnetic force, while still providing the desired easy release feature. Embodiments may include pressure or friction fittings, whereby the head component fits within a tight-fitting socket and the distal end of the pole component. Alternatively, or in addition, the head component and the distal end of the pole component may be secure via hook and loop fasteners or the like.

Further, some embodiments may include a "snap-on" head component, utilizing a male component having a ridge and a female component comprised of a flexible material having a hooked or grooved inner edge to engage the ridge. Pressing the head component onto the distal end of the pole comp sufficient force to cause the female component to flex would allow the head component to "snap-on", while pulling with sufficient force to flex the female component would likewise allow the head component to disengage for the pole portion. One having skill in the art will recognize that either the distal end of the pole portion or the head component could be configured to with either the male or female component and vise versa.

Embodiments wherein the head component is secured to the distal end of the pole component via magnetic force may provide a beneficial feature of allowing the head component to reattach to the pole component automatically by bringing the distal end of the pole component in proximity to the head component such that the magnetic force attracts and aligns them together. This would allow the head component to be reattached quickly and easily without excess bending or work on the part of the trainer. Quick attachment functionality, such as described here, provides the additional benefit of allowing the rope and lure to be quickly swapped out during a training session. For example, a pet may pull the lure and rope free of the pole portion during and training session, at which point the trainer can attach a new rope and lure right away and continuing the training session rather than first retrieving the first rope and lure.

Some embodiments may further utilize a color-coding system applied to the magnetic contact points of each of the head component and the distal end of the pole component. For example, a bright and easily visible marking, such as a bright red, may be applied to the head component to signify the north pole of the embedded magnet, such that the south pole of the magnet embedded in the pole component, indicated, for example, with a blue marking, could be recognized as attaching there. Other color-coding scheme may likewise be utilized, allowing of easy and immediate recognition of the proper means of reattaching the head component.

In various embodiments of the present invention, the strength of the first magnet or the strengths of the first and second magnet may be chosen such that the binding force is overcome by application of a desired amount of pulling force on the rope and/or lure. In such embodiments, the term "excess force" or "sufficient pulling force" is used to describe this desired amount of pulling force. The excess force desired may be dependent on various factors and use cases with may include, but not be limited to, the size and age of the pet, the intensity of the training scenario, and the size and/or composition of the rope and/or lure.

With continued reference to FIG. 1, pole portion 102 may include a set of locking mechanisms 128a,128b whereby the pole portion may be fixed to achieve various length configurations for the pole portion. With continued reference to FIG. 1, pole portion 102 shows locking mechanism 128a attached to external tube section 104 and locking mechanism 128b intermediated section 108. In some embodiments, locking mechanisms 128a, 128b may comprise an internally threaded surface designed to engage externally threaded sections 132a, 132b, respectively, of the next section in sequence. That is, locking mechanism 128a may be designed to engage with external threaded section 132a on the exterior of intermediate section 108. Similarly, locking mechanism 128b may be designed to engage with external threaded section 132b on the exterior of internal section 106. Locking mechanisms 128a, 128b may be designed to rotate so that they may be screwed down onto external threaded sections 132a, 132b, respectively. In this way, each pole section may be secured together while the pole portion is in the collapse configuration. One having skill in the art will recognize that any number of collapsible pole sections may be secure in a similar way. In this way, the pole may have with any number of intermediate length configurations by extending only a portion of the pole sections.

In some embodiments, locking mechanisms 128a, 128b may comprise a snap locking mechanism whereby the internal surface of locking mechanisms 128a, 128b comprise a ridge that is designed to engage a corresponding ridge on the exterior of the next section in sequence, similar to the arrangement depicted in FIG. 1. In such embodiments, locking mechanisms 128a, 128b would be designed to provide a degree of flexion to allow interior and exterior ridges to engage and disengage with the application of sufficient force. In further embodiments, locking mechanisms may comprise friction fittings, magnetic fittings, or the like.

With continued reference to FIG. 1, a rope 133 may be attached a head component 124. Rope 133 may be comprised of various material, including but not limited to Kevlar kite string, fishing line, elastic rope, paracord, or the like. A lure 134 may be attached to rope 133. Lure 134 may comprise a plush toy, small ball such as a tennis ball, an edible treat, or other suitably enticing item to focus a pet's attention.

With further reference to FIG. 1, some embodiments of the present invention may include a set of hooks 136 along pole portion 102. Rope 133 may be wound through hooks 136 to be securely stored when the flirt pole is not in use.

Embodiments of the present invention have been described, as required by statute, to be illustrative, but should not be interpreted to be restrictive. One having skill in the art will recognize that many different arrangements of the various components depicted are possible without departing from the scope of the claims below, as well as arrangements including components not explicitly shown.

One having skill in the art will understand that certain combinations and/or sub-combinations of elements and features are of utility and may be employed without reference to other combinations and/or sub-combinations and are contemplated within the scope of the claims. Not all steps listed in the various figures need be carried out in the specific order described.

What is claimed is:

1. A flirt pole comprising:
   a pole portion having a distal end and a proximal end,
      wherein the proximal end of the pole portion comprises a handle,
      wherein the pole portion comprises at least a first pole section, a second pole section, and a third,
      wherein the second pole section collapses into the first pole section in a first configuration,
      wherein the second pole section extends from the first pole section in a second configuration,
      wherein the third pole section collapses into the second pole section in a third configuration, and
      wherein the third pole section extends from the second pole section in a fourth configuration;
   a head component attached to the distal end of the pole portion,
      wherein the head component is secured to the pole portion such that the head component release on the application of an excess force, and
      wherein the head component is secured to the pole portion via a magnetic force, due at least in part to a first magnet housed within the head component;
   a rope attached to the head component; and
   a lure attached to the rope.

2. The flirt pole of claim 1, wherein the magnetic force is due, in part, to a second magnet housed within the distal end of the pole portion.

3. The flirt pole of independent claim 1, wherein the head component is secured to the pole portion, at least in part, via a snap-on fitting.

4. The flirt pole of independent claim 1, wherein the head component is secured to the pole portion, at least in part, via at least one of a friction fitting and a compression fitting.

5. The flirt pole of independent claim 1, wherein the handle is comprised of a non-slip material.

6. The flirt pole of claim 5, wherein the non-slip material is one of a leather, a natural rubber or a synthetic rubber.

7. The flirt pole of independent claim 1, wherein the rope comprises at least one of a Kevlar kite string, a fishing line, an elastic rope, and a paracord.

8. The flirt pole of independent claim 1, wherein the lure comprises a suitably enticing item to focus a pet's attention.

9. The flirt pole claim 8, wherein the lure comprises at least one of a plush toy, a small ball, an edible treat.

10. A telescopic flirt pole, comprising:
a pole portion comprising at least a first pole section and a second pole section,
   wherein the second pole section collapses into the first pole section in a first configuration, and
   wherein the second pole section extends from the first pole section in a second configuration;
having a distal end and a proximal end; and
a head component attached to the distal end of the pole portion,
   wherein the head component is secured to the pole portion such that the head component release on the application of an excess force, and
   wherein the head component is secured to the pole portion via a magnetic force, due at least in part to a first magnet housed within the head component.

11. The telescopic flit pole of independent claim 10, wherein the proximal end of the pole portion comprises a handle.

12. The telescopic flirt pole of independent claim 10, further comprising at least a third pole section,
   wherein the third pole section collapses into the second pole section in a third configuration, and
   wherein the third pole section extends from the second pole section in a fourth configuration.

13. The telescopic flirt pole of independent claim 10, further comprising a set of locking mechanisms, wherein the first pole section may be fixed relative to the second pole section in the second configuration.

14. The telescopic flirt pole of claim 13, wherein the locking mechanism comprises a first external threaded sections along an outer surface of the first pole section designed to engage a first internally threaded coupling and a second external threaded section along an outer surface of the second pole section designed to engage a second internally threaded coupling.

15. An apparatus comprising:
a head component configured for quick attachment to a flirt pole via a magnetic force,
   wherein the magnetic force is due, at least in part to a first magnet housed within the head component and a second magnet house within the distal end of the pole portion;
a pole portion of a flirt pole having a distal end and a proximal end,
   wherein the proximal end of the pole portion comprises a handle, and
   wherein the head component is attached to the distal end of the pole portion;
a rope attached to the head component; and
a lure attached to the rope.

16. The head component of claim 15, further comprising a first marking indicating a location that the head component attaches to the distal end of the pole portion of the flirt pole.

17. The head component of claim 16, wherein the distal end of the pole portion of the flirt pole a second marking indicating where the distal end of the pole portion of the flirt pole attaches to the head component.

* * * * *